July 4, 1944. H. R. ELLINWOOD 2,352,823
UNIVERSAL SUPPORT FOR CONDUITS
Filed Feb. 3, 1941
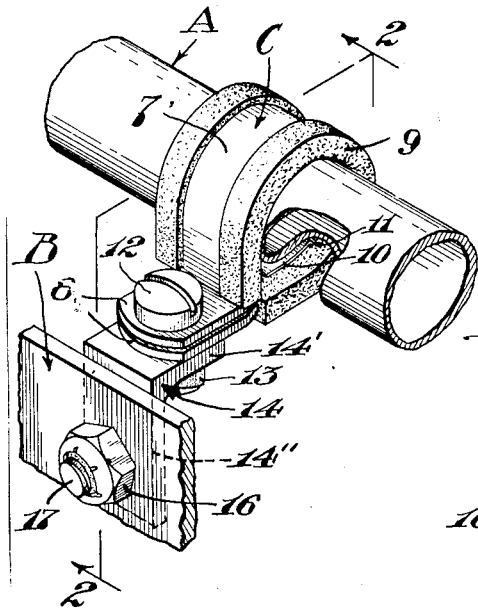
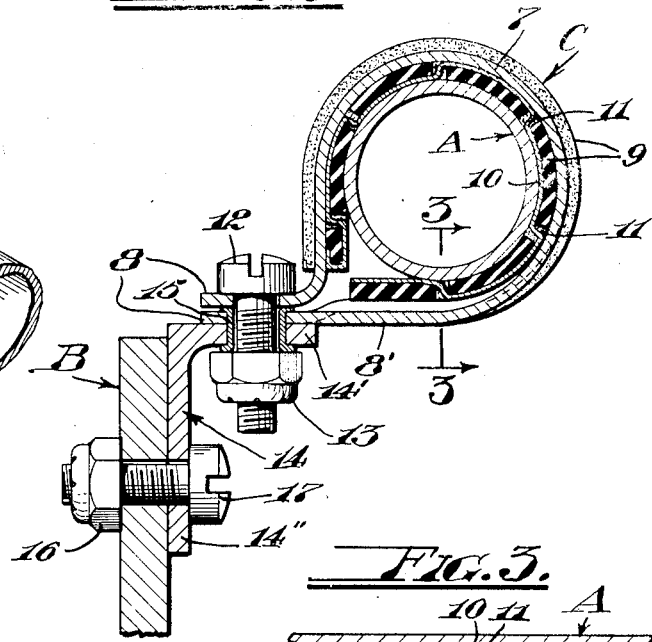
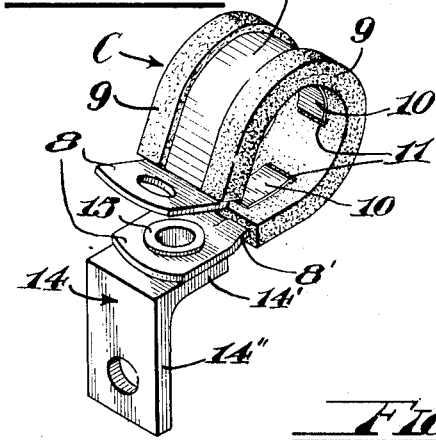
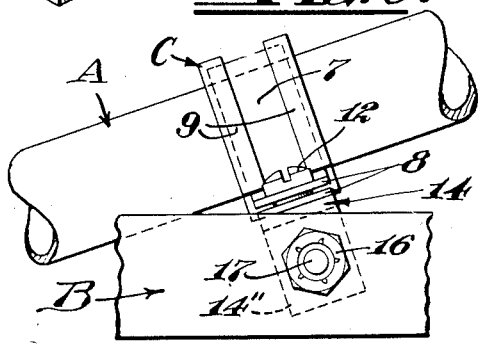
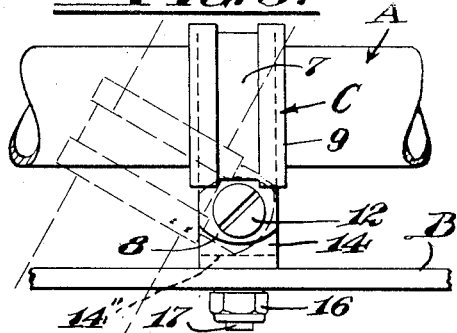
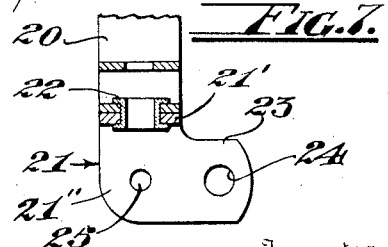
Inventor
Herman Ray Ellinwood
Attorney Patented July 4, 1944

2,352,823

UNITED STATES PATENT OFFICE 2,352,823

UNIVERSAL SUPPORT FOR CONDUITS

Herman Ray Ellinwood, Burbank, Calif., assignor to Adel Precision Products Corp., Burbank, Calif., a corporation of California Application February 3, 1941, Serial No. 377,193

3 Claims. (Cl. 248—74)

The present invention relates to improvement in clips or clamps for supporting air, fuel, oil and other conduit lines in a airplane in such manner that the lines will be cushioned to reduce vibration and wear, and also electrically grounded to the metal structure of airplanes to prevent dangerous discharges of static electricity.

Clips of the type above noted are shown in Letters Patent No. 2,215,283 issued September 17, 1940, to Paul W. Adler, and in my pending applications which are identified as follows: Serial No. 354,104 filed August 24, 1940; Serial No. 354,-105 filed August 24, 1940; and Serial No. 358,366 filed September 25, 1940.

The aforesaid clips are characterized by a metallic line embracing strap having free apertured ends adapted to receive fastening means whereby the ends may be moved towards and away from one another to clamp and release the line to be supported. A rubber, synthetic rubber or like cushion of non-conducting material is mounted on the strap to contact the line for vibration and wear reducing purposes and an electrical conducting or grounding strip is contacted with the strap and overlies the cushion so as to contact the line. The fastening means provides also for mounting the ends of the strap on the metallic structural member of the airplane to which it is desired to tie the line and this mounting completes the electrical contact between the line and the metal of the plane to prevent dangerous static discharges.

In certain instances the structural members of the airplane to which the lines must be secured are not so shaped or disposed as will permit of the use of the apertured free ends of the strap the fastening means therefor, for properly mounting the clips on such structural members, and said free ends are also ill adapted for anchoring the clips where the line takes certain curves and angles relative to said structural members.

In consideration of the somewhat limited application of clips of the type as heretofore employed the present invention has for its primary purpose to provide a clip of the character described having a universally adjustable mounting means in which an apertured lug is swiveled or pivoted on the strap whereby the clip may be readily properly mounted on the desired part of the air plane structure and the line, regardless of the shape or disposition of such part or the curve or angle taken by the line in intersecting or extending close to such part.

More specifically the present invention has for an object the provision of a clip such as hereinbefore described in which the cushioning and electrical "grounding" functions are rendered more effective and positive by reason of the use of an angular bracket or lug for mounting the clip on the airplane structure independently of the means employed for moving the free ends of the clip towards and away from one another, said lug or bracket being pivoted by means of a tubular rivet or eyelet to one of the apertured free ends of the clip and having an aperture affording the connections thereof with the airplane whereby the lug or bracket may be adjusted relative to the clip part to which it is attached, or the clip adjusted relative to the lug or bracket, and the application and removal of the cushion and grounding strip to the line may be effected by moving said free ends without disturbing the universal mounting means of the clip.

With the foregoing objects in view, together with such other objects and advantages as may subsequently appear, the invention is carried into effect as illustrated by way of example in the accompanying drawing, in which:

Fig. 1 is a perspective view of a clip embodying my invention as when in use;

Fig. 2 is a sectional view taken on the line 2—2 of Fig. 1;

Fig. 3 is a sectional view taken on the line 3—3 of Fig. 2;

Fig. 4 is a perspective view of the clip as before application to the line and airplane;

Fig. 5 is a top plan view of the clip as shown in Figs. 1 and 2, showing an adjusted position thereof in dashed lines;

Fig. 6 is a top plan view of the clip showing a particular application thereof to the airplane and line, wherein the line and supporting part of the airplane are angularly related in a manner not shown in the other views hereof;

Fig. 7 is a fragmentary sectional view of a modified form of the invention.

Referring to the drawing more specifically, A designates a typical metallic airplane conduit line for air, water, fuel, oil or other uses, extending adjacent a structural metallic member or part B of an airplane, and secured thereto by means of a clip C embodying the present invention.

As here shown the clip C comprises a metallic strap 7 having apertured free ends 8, and supporting a cushion 9 of compressible, resilient and non-conducting material such as rubber, synthetic rubber or the like. The strap is adapted to embrace the conduit line with the cushion between it and the line so as to absorb shocks and vibrations and reduce wear on the line and strap, the cushion in this instance being of channelled cross section so that it may be clipped on the strap and thus retained as shown in Figs. 1, 2 and 3.

A flexible metallic grounding strip 10 is threaded through apertures 11 in the cushion so as to lie against the strap and also be exposed on the line engaging face of the cushion whereby to electrically connect the line with the strap. Thus it is seen that when the strap is mounted on the metallic structure B of the airplane the line will be grounded to the structural metal of the airplane in such manner as to prevent dangerous discharges of static electricity.

A bolt 12 extended through the apertures in the ends 8 and cooperating with a nut 13 provides for clamping and releasing the clip. When this bolt is tightened it pulls the ends 8 together and thereby forces the cushion and grounding strip into close engagement with the line whereby to effect the desired cushioned and electrically grounded connection of the line with the metallic structure of the airplane.

For the purpose of mounting the clip on the metallic structure B of the airplane I employ an angular metallic lug or bracket 14 which is swiveled or pivoted on the strap as by means of an eyelet or tubular rivet 15 passing through the aperture in one of the ends 8. This one end and a straight contiguous part 8' of the strap form an elongated bearing surface to engage the leg 14' of the lug. The leg 14 is apertured to receive the eyelet 15 and extends at right angles to the leg 14" which is also apertured whereby it may be secured by means of the nut 16 and bolt 17 to the airplane member B. Thus it is seen that the lug or bracket is pivoted on the airplane as well as on the strap whereby the clip is "universally" adjustably mounted and can assume various positions certain of which are shown in Figs. 5 and 6. The bolts 12 and 17 when tightened will hold the clip and lug in the desired relative positions.

It is now apparent that the particular adjustable mounting means hereof will greatly facilitate installation of the conduit lines and supporting clips and a convenient replacement and adjustment of lines and clips. The clamping and releasing action of the clip may be effected without disturbing the adjustable mounting means and the mounting means may be adjusted without disturbing the means for clamping and releasing the clip on the line wherefore the above noted advantages are attainable in a particularly efficacious manner.

The tubular rivet or eyelet 15 holds the lug or bracket 14 on the clip as a part of the complete clip unit as shown in Fig. 4, where the clip unit appears as when ready for application to the line or airplane. This unit can be attached to the line and then to the structural part B, or vice versa, as desired to best suit the conditions at hand. The relative adjustment afforded the clip attaching lug provides for setting of the clip in the desired position to best effect the connection of the line to the airplane, or vice versa, said adjustment depending on the angle or position of line or of the structural part of the plane on which the line is to be supported.

With reference to Fig. 7, it is seen that a modified form of the invention includes a clip 20 of the same construction as clip C but provided with a different form of attaching lug or bracket 21, the leg 21' of which is pivoted thereon by means of a tubular rivet or eyelet 22. This bracket is L-shaped like bracket 14 but has a lateral extension 23 from the leg 21", said extension having an opening 24 therein in line with an opening 25 in the leg 21. Opening 25 is adapted to receive a rivet (not shown) and opening 24, a screw (not shown) for securing the bracket to the airplane but any suitable fastening may be used for mounting this bracket in place and the opening 25 and its rivet may be omitted, if desired. The extension 23 affords a more secure and stable fastening of the clip, the screw being insertable through the opening 25 after the bracket has been adjusted, or may be inserted first and the riveting done afterward as desired. This form may be better suited to certain installations than the other form of my invention due to the added bearing surface fastening provisions afforded by the extension 23.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a conduit line support, a metallic strap adapted to embrace a conduit line and having apertured free ends, an attaching bracket, and a tubular rivet pivotally connecting said bracket with one of said ends, said bracket having a single opening whereby it may be pivotally secured to a structure on which the line is to be supported, a bolt inserted through the aperture in said other end and the rivet for clamping said other end against one end of said rivet, and a nut on said bolt contacting the other end of said rivet.

2. In a conduit line support, a metallic strap adapted to embrace a conduit line and having apertured free ends, an attaching bracket, a tubular rivet pivotally connecting said bracket with one of said ends, means for pivotally connecting said bracket with a support, a bolt extending through the apertures of said ends and the bore of said rivet, and a nut mounted on said bolt for abutting the end of the rivet which engages said bracket.

3. In a conduit line supporting clip, a strap adapted to embrace a conduit line and having an aperture therein, a right angular bracket, means for pivoting one leg of said bracket to a structure on which it is desired to support the line, the other leg of said bracket having an aperture therein for registration with the aperture in said strap, a rivet fastening mounted in said apertures for pivotally connecting the bracket to the strap as a strap-carried part of the clip, a bolt carried by said strap and extending through said fastening, and a nut apart from said rivet mounted on said bolt in opposition to said bracket.

HERMAN RAY ELLINWOOD.